United States Patent [19]

Dais et al.

[11] Patent Number: 5,049,223
[45] Date of Patent: Sep. 17, 1991

[54] USE OF SURFACE ACTIVE AGENTS FOR IMPROVED COOLING OF THERMOPLASTIC FILM WEBS

[75] Inventors: Brian C. Dais, Midland; Burdette W. Miller, Freeland, both of Mich.

[73] Assignee: DowBrands, Inc., Indianapolis, Ind.

[21] Appl. No.: 461,870

[22] Filed: Jan. 8, 1990

[51] Int. Cl.$^5$ ............................................. B29C 47/88
[52] U.S. Cl. ...................... 156/244.11; 156/244.25; 264/177.19; 264/178 R; 264/237
[58] Field of Search ............. 264/237, 177.19, 177.17, 264/178 R; 425/131.1, 71; 156/66, 244.11, 244.25, 244.15, 244.14

[56] References Cited

U.S. PATENT DOCUMENTS

| | | | |
|---|---|---|---|
| 3,320,340 | 5/1967 | Luca | 425/326.1 |
| 3,778,205 | 12/1973 | Turner et al. | 425/71 |
| 3,851,028 | 11/1974 | Beyer | 264/237 |
| 3,892,834 | 7/1975 | Pritchard | 264/237 |
| 4,263,079 | 4/1981 | Sutrina | 156/66 |
| 4,540,537 | 9/1985 | Kamp | 425/131.1 |
| 4,555,282 | 11/1985 | Yano | 156/244.25 |
| 4,676,851 | 6/1987 | Scheibner et al. | 156/244.25 |
| 4,683,015 | 7/1987 | Wagers | 156/66 |

Primary Examiner—Jeffery Thurlow

[57] ABSTRACT

An improved cooling process for thermoplastic film webs, profiles, or shapes and interlocking closure profiles extruded onto film webs for use on reclosable bags or containers is provided. A mixture of a surfactant and water is used to cool film webs or closure profiles which have been extruded and secured onto a film web. The surfactant lowers the surface tension of the water, improving its wetting properties and providing faster cooling of the film. The resulting film structures are more stable and consistent in structure.

10 Claims, 2 Drawing Sheets

USE OF SURFACE ACTIVE AGENTS FOR IMPROVED COOLING OF THERMOPLASTIC FILM WEBS

BACKGROUND OF THE INVENTION

This application relates to an improved cooling process for thermoplastic film webs as well as to closure profiles secured to film webs for use on reclosable plastic bags or containers, and to the use of surfactants to aid in the cooling process.

For a considerable period of time, plastic bags or containers which feature reclosable fasteners have been widely used by consumers and industry. Typically, the interlocking closure profiles on the container are pressed together or pulled apart to seal or open the container. Although many different processes have been developed to manufacture such closure profiles, most processes in the art utilize an extrusion die in which a closure profile of a thermoplastic resin such as polyethylene is extruded and subsequently joined to a thermoplastic film web or sheet. A common method involves joining the extruded closure profiles onto the film while hot so that a firm bond is formed. Consequently, a cooling step is generally included in the manufacturing process to facilitate removal of heat from the freshly extruded profiles to cool and stabilize the profile shapes. Water is a well known coolant used in the cooling step.

For example, in U.S. Pat. 4,540,537, Kamp discusses the use of an extrusion die for producing closure profiles. After extrusion, the closure profiles enter a cooling bath containing water.

The process taught by Wagers in U.S. Pat. No. 4,764,977 involves extruding the closure profiles and subsequently securing them to an underlying plastic film web where water is then sprayed onto the extruded profiles on the film web to cool them.

Scheibner et al, U.S Pat. No. 4,676,851 also teach extruding interlocking closure profiles, joining them to a film surface and subsequently directing a flow of liquid coolant such liquid nitrogen, chilled brine, or water onto the closure profiles through cooling nozzles.

Noguchi, U.S. Pat. No. 3,945,872 also relates to the extrusion of closure profiles which are bonded to a film surface, and teaches the use of a jet mechanism containing a gas or liquid coolant such as water for cooling the extruded profiles.

Sutrina et al, U.S. Pat. No. 4,295,919, also relates to a process for fusing closure profiles to separately extruded film and then utilizing water spray jets to cool the closure profiles.

Although water is widely used as a cooling agent, water has a high surface tension which prevents it from effectively wetting the surface of thermoplastic resins such as polyethylene, which has a much lower surface tension. The high surface tension of water causes it to "bead up" on the film, resulting in a slow transfer of heat from the closure profiles to the water. In many extrusion apparatuses, air jets have been used in conjunction with water to aid in the cooling process. However, this method becomes inefficient as manufacturing speeds increase because the time allotted for cooling the profiles after bonding to the underlying film web decreases. Insufficient cooling of the profiles may lead to deformation of the still warm and soft profiles at subsequent stages of the manufacturing process. This, in turn, may result in unacceptable zipper performance on finished bags.

Accordingly, a need exists in the art for an improved method for cooling freshly extruded film webs, particularly interlocking closure profiles on those webs.

SUMMARY OF THE INVENTION

The present invention meets that need by adding a surfactant to the water used to cool freshly extruded film webs, profiles, or shapes, and more particularly to cool interlocking closure profiles which have been extruded onto a film web.

By profiles or shapes, we mean the shaping of a thermoplastic material in a forming die into sheets, channels, lenticular cross-sections, and tubes or parisons, or the shaping of such material outside of a forming die by a heated post-forming procedure.

The addition of a surfactant to the water in the cooling process lowers the surface tension of water and improves its wetting properties, resulting in faster cooling of the film and closure profile. Further, the addition of a surfactant does not adversely affect the geometry of the bag or container formed by extrusion nor does it affect the bond formation between the interlocking closure profiles and the film web.

In accordance with the preferred embodiment of the present invention, a continuous length of a thermoplastic interlocking closure profile is extruded from a die opening and secured to a film web or sheet while hot or is formed integrally with the film web. A coolant mixture of a surfactant and water is then sprayed onto the extruded closure profile to wet the surface of the profile, to cool it.

When the surfactant/water coolant mixture is sprayed onto the closure profile, the surface tension of the coolant is reduced and the coolant better wets the surface of the closure profile. The heat transfer efficiency from the closure profile to the coolant is increased, thus cooling the profile at a more rapid rate than heretofore possible.

In another embodiment of the invention, the surfactant/water coolant mixture may be used in the same manner as described above on freshly extruded film webs or other extruded thermoplastic profiles or shapes for use in making flexible packages or other containers. It may be sprayed onto single layer webs, multilayer webs or laminates.

Accordingly, it is an object of the present invention to provide an improved process for cooling an extruded film web, as well as interlocking closure profiles extruded onto a film web, for use on reclosable bags or other flexible packages which includes the addition of a surfactant to a water coolant to improve the surface wetting of the film and decrease the time required to cool the film. Other objects and advantages of the invention will be apparent from the following description, the accompanying drawings and the appended claims.

DETAILED DESCRIPTION OF THE PREFERRED EMBODIMENT

While the present invention may be implemented in many conventional extrusion processes, for simplicity, only the preferred embodiment of the invention is explained in more detail below.

Figure 1:
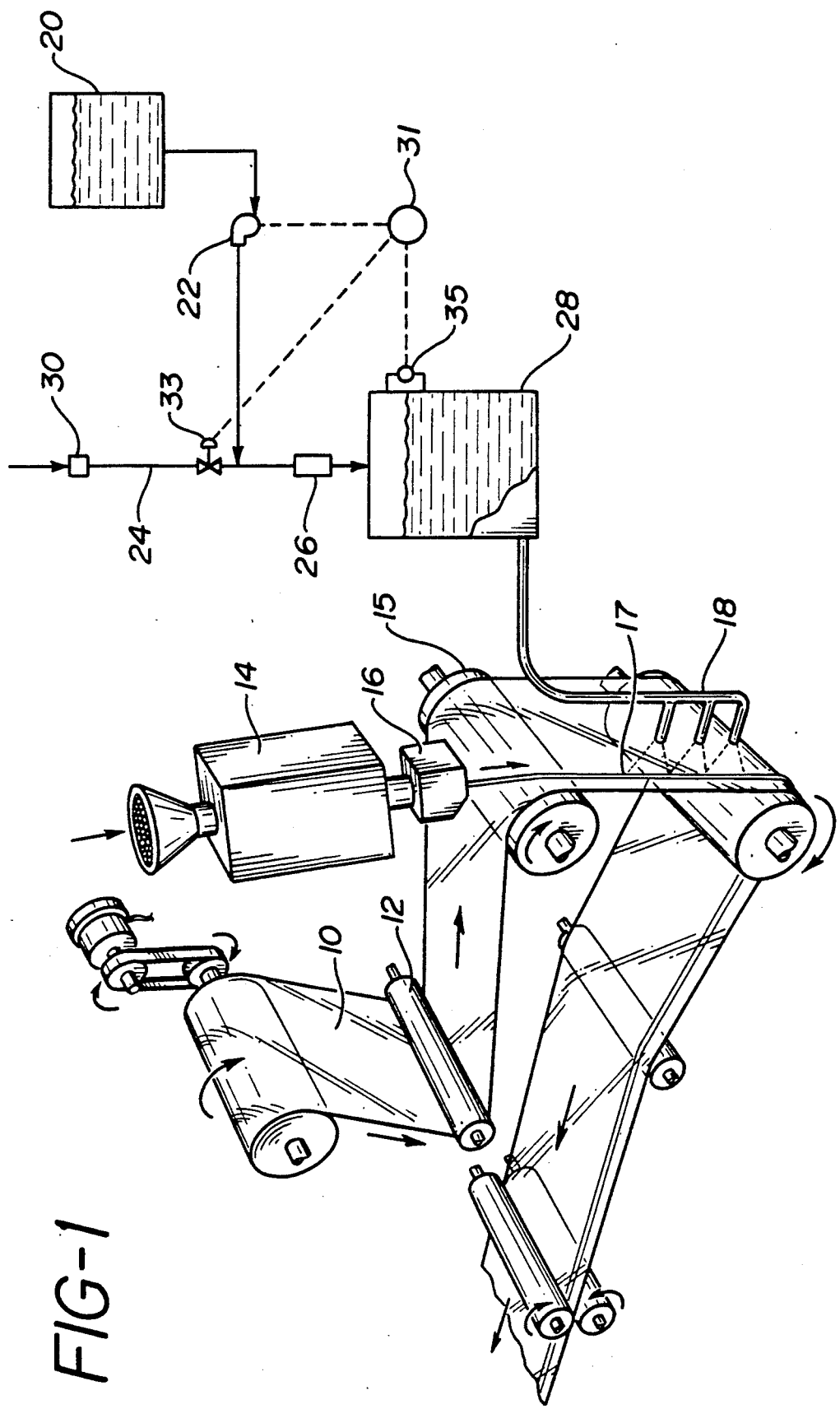
FIG. 1 is a partially perspective, partially schematic illustration of an apparatus suitable for use in the process of the present invention.

FIG. 1 illustrates a typical extrusion apparatus which may be used in the cooling process of the present invention. It will be apparent to those skilled in the art that the process of the present invention may be used in a number of different apparatuses which utilize contact to cool freshly extruded closure profiles. For example, the process of the present invention may be used to cool profiles which have been formed integrally with a thermoplastic film web by extrusion through a single die.

A previously formed continuous film web 10 is directed around idler roll 12 and onto driven roll 15 where a freshly extruded closure profile 17 is secured thereto. Closure profile 17 may be formed from a thermoplastic resin which is fed through a conventional screw extruder 14, extruded through die block 16, and secured to the film web while hot. For simplicity and ease of understanding, only a single closure profile has been shown. In actual practice, typically a pair of complementary rib and groove closure profiles would be extruded and secured along opposite edges of film web 10. After the closure profile 17 is joined onto the web, the closure profile is cooled by a surfactant/water coolant mixture through nozzles or jets 18.

As further illustrated in FIG. 1, the surfactant used in the coolant and sprayed through nozzles 18 is stored in a storage tank 20 and fed through pump 22 where it is mixed with water in incoming water line 24 using a mixer such as inline mixer 26. In some instances, a mixer may not be necessary as the surfactant will disperse satisfactorily in the water without additional agitation or mixing. The coolant mixture is then fed into storage tank 28 where it is pumped to the spray nozzles as needed. A pressure regulator 30 is used to maintain a constant flow of incoming water. Optionally, a controller mechanism, schematically indicated at 31, may be used to control the concentration of surfactant, amount of cooling water, and level of coolant in storage tank 28 through control of pump 22, valve 33, and level sensor 35.

After the closure profiles have been secured to the film web and cooled, the web assembly may be further processed as is conventional in the art to form individual reclosable, flexible plastic bags or containers.

Figure 2:
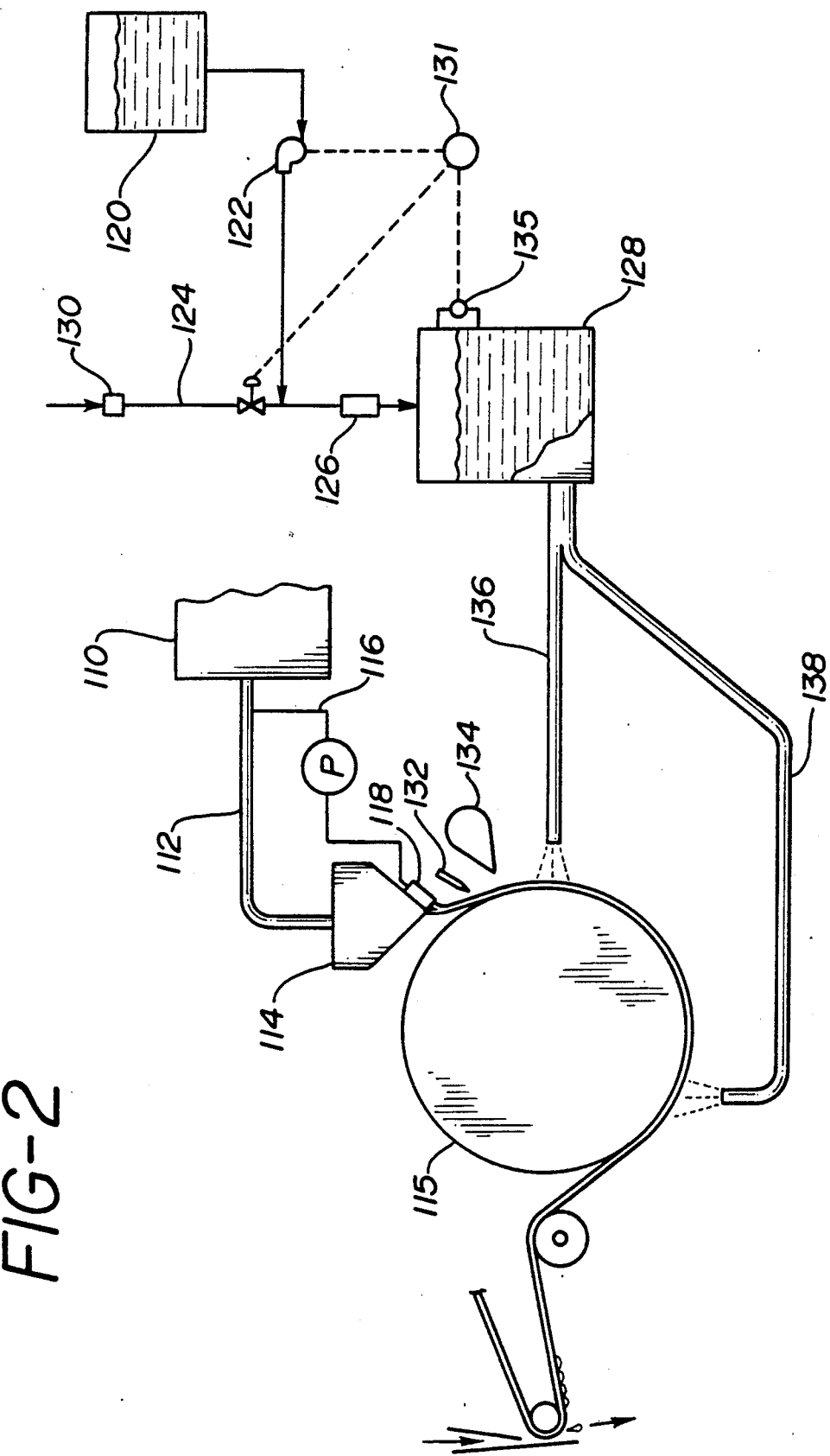
FIG. 2 is a schematic illustration of another type of apparatus suitable for use in the process of the present invention.

FIG. 2 illustrates the cooling process of the present invention using another type of extrusion apparatus in which the film web and closure profiles are formed simultaneously and then joined together. The apparatus comprises a conventional screw extruder 110 with an extruder pipeline 112 feeding melted resin to a film die 114. A second extruder pipeline 116 supplies resin to closure profile die block 118 so that the closure profile extruded from die block 118 combines with the film leaving the film die 114. The film is then wound around chill roll 115 and an air jet 132 and/or air knife 134 is used to assure good contact of the film and closure profile. The closure profile and film are then sprayed with the coolant surfactant/water mixture through spray jet 136 to cool the film and closure profile. A second-spray jet 138 may be located on the side of chill roll 115 opposite from the air knife to further facilitate cooling of the film and profile.

As further illustrated in FIG. 2, the surfactant used in the coolant and sprayed through nozzles 118 is stored in a storage tank 120 and fed through pump 122 where it is mixed with water in incoming water line 124 using a mixer such as inline mixer 126. The coolant mixture is then fed into storage tank 128 where it is pumped to the spray nozzles as needed. A pressure regulator 130 is used to maintain a constant flow of incoming water. Optionally, a controller mechanism, schematically indicated at 131, may be used to control the concentration of surfactant, amount of cooling water, and level of coolant in storage tank 128 through control of pump 122, valve 133, and level sensor 135.

After the closure profiles have been cooled, the web assembly may be further processed as is conventional in the art to form reclosable plastic bags or containers.

The surfactant used in the coolant mixture should preferably be water-soluble. Further, as the coolant mixture is impinged on plastic webs intended for use in packaging and storing food items, it should be nontoxic and approved for use by the U.S. Food and Drug Administration. A preferred surfactant is Igepal CO-630, known as nonylphenoxy(ethyleneoxy)ethanol. Other nonionic surfactants useful in the practice of the present invention include Tween 20, available from ICI America. The concentration of surfactant in water is preferably in the range of about 100-200 ppm. Lesser concentrations of surfactant, while useful, are not as effective in reducing the surface tension of the water. Greater concentrations of surfactant are also useful, but do not result in any further reductions in the surface tension of the water. When added in concentrations of between 100-200 ppm, the surface tension of water is reduced from about 72 dynes/cm to about 36 dynes/cm. The surface tension of thermoplastic polymer resins are typically much less than that of water. For example, polyethylene film which is typically used in such extrusion processes is about 31 dynes/cm, so the lowered surface tension of the water almost equals the surface tension of the film. This lower surface tension allows the water to better wet and contact the closure profile, resulting in more efficient heat transfer from the closure profile to the water. Because the closure profile is cooled more efficiently with the use of the surfactant, line speeds for the film assembly may be increased.

Generally, the temperature of a polyethylene closure profile as it exits the extruder is about 230° C. With previous cooling processes using water alone, the temperature of the closure profiles is reduced to about 75° C. after exposure to the cooling water. With the coolant surfactant/water mixture of the present invention, the closure profile temperature is reduced an additional 8°-12° C. This results in the formation of more stable, consistent zipper elements with greater uniformity when inconsistency and instability is caused by higher temperature.

In addition, the use of the surfactant of the present invention does not adversely affect the properties of the closure profile or film, thus aiding in stable closure profile and film formation. The surfactant also acts as a mild detergent when pumped through water lines, keeping them free from contaminants.

As mentioned previously, the surfactant/water mixture may also be applied in many other industrial extrusion processes. For example, in the manufacture of flexible plastic packages or containers, the surfactant may be sprayed onto a freshly extruded film web or other extruded profile or shape to aid in cooling the plastic material for further processing. The surfactant produces the desired cooling effects on various extrudable thermoplastics, including single or multilayer webs comprised of, for example, polyethylene, polypropylene, amorphous nylon, or polyethylene terephthalate glycol.

In order that the invention may be more readily understood, reference is made to the following working examples, which are intended to illustrate the preferred embodiment of the invention but are not to be taken as limiting the scope thereof.

EXAMPLE 1

A male closure profile of a polyethylene resin was extruded and secured to an underlying film web using the apparatus shown in FIG. 2 and cooled with pure water. The temperature of the closure profile as it left contact with chill roll 130 was measured with an Ircon pyrometer and found to be 62° C.

EXAMPLE 2

A male closure profile of the same polyethylene resin was extruded and secured to a film web as in Example 1 and cooled with a mixture of 200 ppm Igepal CO-630 surfactant and water. The temperature of the closure profile as it left contact with chill roll 130 was measured with an Ircon pyrometer and found to be 53° C.

EXAMPLE 3

A male closure profile of the same polyethylene resin was extruded and secured to a film web as in Example 1 and cooled with a mixture of 400 ppm Igepal CO-630 surfactant and water. The temperature of the closure profile as it left contact with chill roll 130 was measured with an Ircon pyrometer and found to be 53° C.

Having described the invention in detail and by reference to preferred embodiments thereof, it will be apparent that modifications and variations are possible without departing from the scope of the invention defined in the appended claims.

What is claimed is:

1. A process for cooling thermoplastic closure profiles used to produce reclosable flexible bags or containers for packaging and storing food items comprising the steps of:

extruding a heated thermoplastic closure profile onto a film web; and directing a flow of a liquid coolant mixture comprising a nontoxic water-soluble surfactant and water onto the extruded closure profile to wet the surface thereof and thereby cool and stabilize the structure thereof.

2. The process of claim 1 wherein said surfactant is present in said liquid coolant mixture in an amount of between about 100 to 200 ppm.

3. The process of claim 1 wherein said surfactant is a nonionic surfactant.

4. The process of claim 3 said surfactant is nonylphenoxypoly(ethyleneoxy)ethanol).

5. A process for cooling thermoplastic film webs and closure profiles for use in recloseable flexible packages for storing food items comprising the steps of:

extruding a thermoplastic film web and securing thereto a heated closure profile; and directing a flow of a liquid coolant comprising water containing at least 100 ppm of a nontoxic water-soluble surfactant onto the extruded film web and closure profile to wet the surfaces thereof and thereby cool and stabilize the structure thereof.

6. The process of claim 5 wherein the surfactant is nonylphenoxypoly(ethyleneoxy)ethanol).

7. A process for cooling interlocking closure profiles for use in reclosable flexible containers for packaging and storing food items comprising the steps of:

forming a continuous thermoplastic film web having an interlocking closure profile integral therewith; and directing a flow of liquid coolant mixture comprising a nontoxic water-soluble surfactant and water onto said closure profile to cool and stabilize the structure thereof.

8. The process of claim 7 wherein said surfactant is present in said liquid coolant mixture in an amount of between about 100 to 200 ppm.

9. The process of claim 7 wherein the surfactant is a nonionic surfactant.

10. The process of claim 7 wherein the surfactant is nonylphenoxypoly(ethyleneoxy)ethanol).

* * * * *